(12) United States Patent
Wright

(10) Patent No.: US 8,967,868 B2
(45) Date of Patent: Mar. 3, 2015

(54) THREADED BEARING RETAINER

(71) Applicant: Caterpillar Inc., Peoria, IL (US)

(72) Inventor: Brian C. Wright, Decatur, IL (US)

(73) Assignee: Caterpillar Inc., Peoria, IL (US)

( * ) Notice: Subject to any disclaimer, the term of this patent is extended or adjusted under 35 U.S.C. 154(b) by 110 days.

(21) Appl. No.: 13/628,688

(22) Filed: Sep. 27, 2012

(65) Prior Publication Data

US 2014/0086518 A1   Mar. 27, 2014

(51) Int. Cl.
*F16C 25/04* (2006.01)
*F16C 11/00* (2006.01)
*F16C 11/06* (2006.01)

(52) U.S. Cl.
CPC ......... *F16C 11/0642* (2013.01); *F16C 2208/04* (2013.01)
USPC .......................................... 384/208; 403/135

(58) Field of Classification Search
CPC .......... F16C 33/72; F16C 33/66; F16C 33/58; F16C 33/74; F16C 11/0623; F16C 11/0633; F16C 11/0638; F16C 11/0642
USPC ............................ 384/206–213; 403/122–144
See application file for complete search history.

(56) References Cited

U.S. PATENT DOCUMENTS

| | | | |
|---|---|---|---|
| 3,305,617 A | 2/1967 | Dumpis | |
| 4,386,869 A * | 6/1983 | Smith | 403/39 |
| 4,577,988 A | 3/1986 | Gollub et al. | |
| 4,790,682 A * | 12/1988 | Henkel | 403/140 |
| 5,615,967 A * | 4/1997 | Hellon | 403/133 |
| 5,885,022 A | 3/1999 | Maughan et al. | |
| 6,254,114 B1 * | 7/2001 | Pulling et al. | 280/93.511 |
| 6,592,284 B1 * | 7/2003 | Rechtien et al. | 403/12 |
| 6,733,200 B2 * | 5/2004 | Ueno | 403/133 |
| 6,908,251 B2 * | 6/2005 | Molenaar | 403/142 |
| 7,753,611 B2 * | 7/2010 | Ergodan | 403/138 |
| 8,079,607 B2 | 12/2011 | Gaumer | |
| 8,453,787 B2 * | 6/2013 | Rager et al. | 180/352 |
| 2003/0002914 A1 * | 1/2003 | Ueno | 403/143 |
| 2009/0238636 A1 * | 9/2009 | Howe et al. | 403/127 |
| 2009/0252443 A1 | 10/2009 | Gaumer | |

FOREIGN PATENT DOCUMENTS

| | | |
|---|---|---|
| DE | 10 2008 017 953 A1 | 11/2008 |
| EP | 0082638 | 6/1983 |
| EP | 132 598 B1 | 2/1985 |
| GB | 753234 A | 7/1956 |
| GB | 891798 A | 3/1962 |
| JP | 05057429 | 7/1993 |
| JP | 2004293572 | 10/2004 |

* cited by examiner

*Primary Examiner* — Alan B Waits
(74) *Attorney, Agent, or Firm* — Miller, Matthias & Hull LLP

(57) ABSTRACT

A threaded bearing retainer for a spherical bearing may include an annular top surface, an annular bottom surface, and an externally threaded cylindrical outer surface extending between the top and bottom surfaces and meshing with the internal threads of a housing bore. The bearing retainer may further include an annular sealing rib extending downwardly from the bottom surface and engaging the bore shoulder of the housing bore to form a substantially water-tight seal when the bearing retainer is screwed into the housing bore.

17 Claims, 5 Drawing Sheets

THREADED BEARING RETAINER

TECHNICAL FIELD

The present invention is generally directed to a spherical bearing for use in a steering joint for heavy vehicles and other equipment and, more particularly, to a spherical bearing having a threaded bearing retainer having improved sealing features.

BACKGROUND

Steering assemblies for heavy vehicles and hauling equipment typically include steering components such as steering members and steering hubs that are pivotally coupled to the frame of the machine or vehicle being steered. Linkages, such as tie rods, are pivotally connected between the steering member and the hub so that movement of the steering members causes a corresponding rotation of the hub to turn the wheels or an articulated portion of the frame to steer the machine or vehicle. Shock absorbers or other damping mechanisms may also be pivotally coupled between the frame and the hub to dampen the movement of the steering assembly to prevent damage to the steering components. The tie rods and shock absorbers are typically connected at each end by socket assemblies that provide some rotational freedom of the tie rods and shock absorbers to further prevent damage from occurring.

The socket assemblies in many implementations include spherical bearings facilitating the desired movement. Spherical bearings typically include a steel alloy or ceramic ball disposed within a steel alloy outer race retained within a cylindrical inner surface of a rod end. The outer race defines an inner surface contoured to receive the spherical ball therein. The ball slides and rotates relative to the outer race to provide the desired degree of freedom of movement. A lubricant is typically provided between the spherical ball and outer race to reduce friction and increase the useful life of the bearing. The outer race and, correspondingly, the ball and lubricant are retained in the inner surface of the rod end by a cover, retainer or bearing cap.

In current implementations, the cover is press-fit into the inner surface of the rod end and/or secured by a snap-ring retainer to retain and seal the outer race and lubricant within the rod end. An example of such a cover is provided in U.S. Pat. No. 8,079,607, issued on Dec. 20, 2011 to Gaumer and entitled, "Spherical Bearing for a Steering Joint." The Gaumer patent teaches a spherical bearing having a cover positioned in a portion of a bore adjacent to a cover end of the outer race and secured in place by a retaining ring. Lubricant can be placed in the bore of a bearing receiving section when the cover is removed. When installed, the cover helps retain the lubricant in the spherical bearing and provide a barrier to foreign matter entry into the rod end.

Lubricants such as oil and grease may be added and sealed within the rod end when the bearing retainer is installed. Fill openings may be provided in the bearing retainer to facilitate the initial infusion of lubricant if the retainer is already installed, or to provide additional fresh lubricant after a period of use. One issue with greasing or lubricating with the presently known bearing retainers and covers is that a large portion of the lubricant escapes around the retainer or cover if the retainer or cover is not perfectly sealed when it is press-fit or the snap-ring retainer is installed. The issue may occur due to the sizing of the bearing retainer, the snap-ring retainer and the inner surface of the rod end, or due to misalignment during installation. As the lubricant escapes from the socket assembly, the friction between the moving components increases and ultimately causes premature failure and need for replacement of the socket assembly before the end of its design life. In view of this, a need exists for an improved bearing retainer that is reliably installed to form a sufficient seal that prevents leakage of lubricant from the socket assembly and the corresponding reduction in the useful life of the socket assembly.

SUMMARY OF THE DISCLOSURE

In one aspect of the present disclosure, a bearing retainer is disclosed for a spherical bearing in an assembly that may include a housing having a housing bore defined by a bore inner surface having a first bore portion having an inner diameter and internal threads, and a first bore shoulder extending inwardly from the first bore portion and having an inner diameter. The bearing retainer may include an annular top surface, an annular bottom surface, and a cylindrical outer surface extending between the top surface and the bottom surface and including external threads configured to mesh with the internal threads of the first bore portion of the housing bore. The bearing retainer may further include an annular sealing rib extending downwardly from the bottom surface of the bearing retainer and having a diameter that is greater than the inner diameter of the first bore shoulder, wherein the sealing rib engages the first bore shoulder to form a substantially water-tight seal when the bearing retainer is screwed into the first bore portion of the housing bore.

In another aspect of the present disclosure, the invention is directed to a spherical bearing for an assembly having a housing with a housing bore defined by a bore inner surface having a first bore portion having an inner diameter and internal threads, and a second bore portion having an inner diameter that is less than the inner diameter of the first bore portion, a first bore shoulder extending between the first bore portion and the second bore portion, and a second bore shoulder extending inwardly from an end of the second bore portion opposite the first bore shoulder. The spherical bearing may include a ball having a spherical external surface, an outer race having a first end, a second end, and an inner surface having a complimentary shape to the spherical external surface of the ball, wherein the outer race is disposed within the second bore portion of the housing bore between the first bore shoulder and the second bore shoulder, and a bearing retainer. The bearing retainer may include an annular top surface, an annular bottom surface, a cylindrical outer surface extending between the top surface and the bottom surface and including external threads configured to mesh with the internal threads of the first bore portion of the housing bore, and an annular sealing rib extending downwardly from the bottom surface of the bearing retainer. The annular sealing rib may have a diameter that is greater than an inner diameter of the first bore shoulder, with the sealing rib engaging the first bore shoulder to form a substantially water-tight seal when the bearing retainer is screwed into the first bore portion of the housing bore, and with the bottom surface of the bearing retainer engaging the first end of the outer race to retain the outer race within the second bore portion between the first bore shoulder and the second bore shoulder.

In a further aspect of the present disclosure, the invention is directed to a spherical bearing assembly includes a housing having a housing bore defined by a bore inner surface having a first bore portion having an inner diameter and internal threads, a second bore portion having an inner diameter that is less than the inner diameter of the first bore portion, a first bore shoulder extending between the first bore portion and the second bore portion, and a second bore shoulder extending inwardly from an end of the second bore portion opposite the first bore shoulder. The spherical bearing assembly further includes a ball having a spherical external surface, an outer race having a first end, a second end, and an inner surface having a complimentary shape to the spherical external surface of the ball, wherein the outer race is disposed within the second bore portion of the housing bore between the first bore shoulder and the second bore shoulder, and a bearing retainer. The bearing retainer includes an annular top surface, an annular bottom surface, a cylindrical outer surface extending between the top surface and the bottom surface and including external threads configured to mesh with the internal threads of the first bore portion of the housing bore, and an annular sealing rib extending downwardly from the bottom surface of the bearing retainer. The annular sealing rib has a diameter that is greater than the inner diameter of the first bore shoulder, with the sealing rib engaging the first bore shoulder to form a substantially water-tight seal when the bearing retainer is screwed into the first bore portion of the housing bore, and with the bottom surface of the bearing retainer engaging the first end of the outer race to retain the outer race within the second bore portion between the first bore shoulder and the second bore shoulder.

Additional aspects are defined by the claims of this patent.

DETAILED DESCRIPTION

Although the following text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
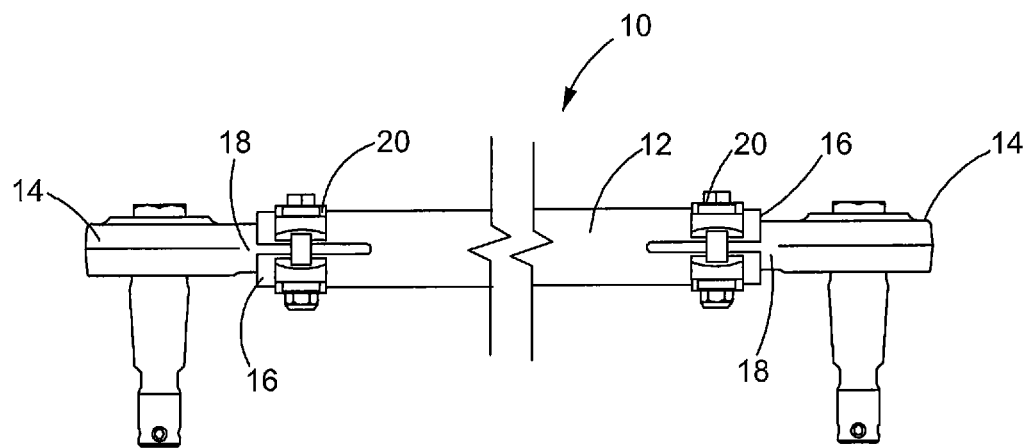
FIG. 1 is a side view of a linkage assembly having rod end assemblies in accordance with the present disclosure.

FIG. 1 illustrates a linkage assembly 10 for system such as a steering assembly as described above using socket assemblies to provide a degree of freedom of motion of the connecting link when the connected parts move relative to each other. The linkage assembly 10 may be a tie rod assembly as shown or an assembly having a different connecting linkage with socket assemblies at either end. The linkage assembly 10 includes a tie rod 12 and a pair of rod end assemblies 14 each connected to the tie rod 12 and a corresponding one or oppositely disposed ends 16 of the tie rod 12. Each end 16 of the tie rod 12 receives a shaft portion 18 of the corresponding rod end assembly 14, and a corresponding clamp 20 secures the shaft portion 18 within the end 16 of the tie rod 12. Similar arrangements for connecting the rod end assemblies 14 to other types of linkages such as shock absorbers will be apparent to those skilled in the art.

Figure 2:
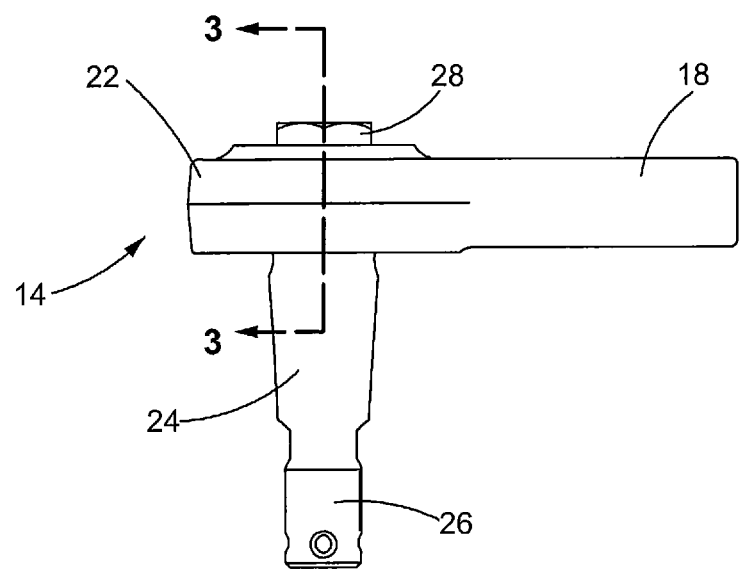
FIG. 2 is a side view of one of the rod end assemblies of FIG. 1.

An embodiment of the rod end assembly 14 is shown in greater detail in FIG. 2. The shaft portion 18 may be an integral component of a rod end housing 22 enclosing a spherical bearing of the rod end assembly 14. A stud 24 of the spherical bearing may extend from the rod end housing 22 and terminate at a connection end 26 that may connect the rod end assembly 14 to a frame, hub or other interconnected component of the vehicle or machine. Opposite the stud 24, a bearing retainer 28 in accordance with the present disclosure is installed on the rod end housing 22 and engages the rod end housing 22 to retain the spherical bearing and applied lubricant within the rod end housing 22 in a manner described more fully below.

Figure 3:
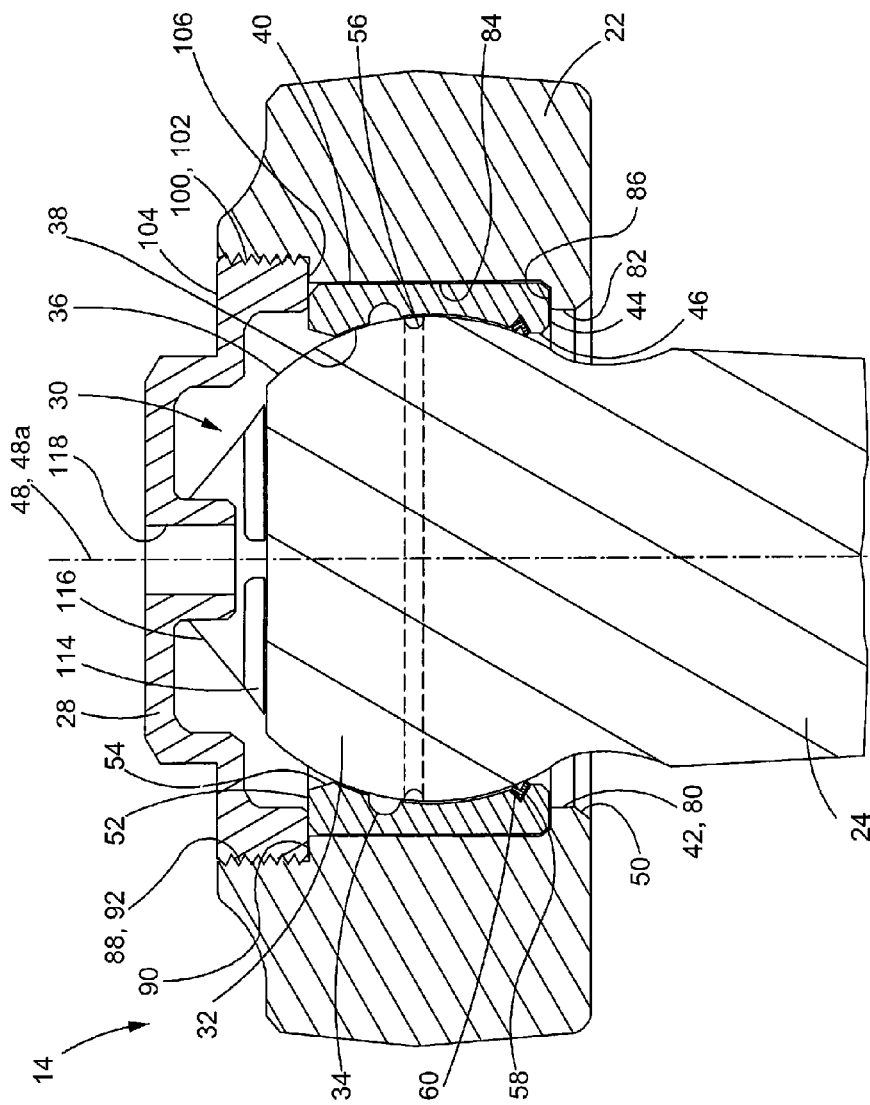
FIG. 3 is a cross-sectional view of the rod end assembly of FIG. 2 taken through line 3-3.

The internal components of the rod end assembly 14 are shown in cross-section in FIG. 3. The rod end assembly 14 includes a spherical bearing 30 having a ball 32 rotatably received within an outer race 34. The ball 32 has a generally spherical external surface 36 defined by an outer diameter of the ball 32, with the stud 24 extending from one side of the ball 32. The outer race 34 has a spherical inner surface 38 contoured to correspond to the shape defined by the external surface 36 of the ball 32, and a cylindrical external surface 40 received in a bore 42 through the rod end housing 22. At a lower end 44 of the outer race 34, the inner surface 38 terminates at an annular first tapered portion 46. The stud 24 extends from the ball 32 and through the first tapered portion 46 to the exterior of the rod end housing 22. The configuration of the outer race 34 allows the ball 32 and stud 24 to rotate with respect to the rod end housing 22 about a longitudinal axis 48 and/or such that the longitudinal axis offsets from the depicted vertical orientation until the external surface is engaged by the first tapered portion 46 or a tapered or countersunk portion 50 of the bore 42. At an upper end 52 of the outer race 34, the inner surface 38 terminates at an annular second tapered portion 54, with the second tapered portion 54 assisting the flow of lubricant between the ball 32 and the outer race 34.

Figure 4:
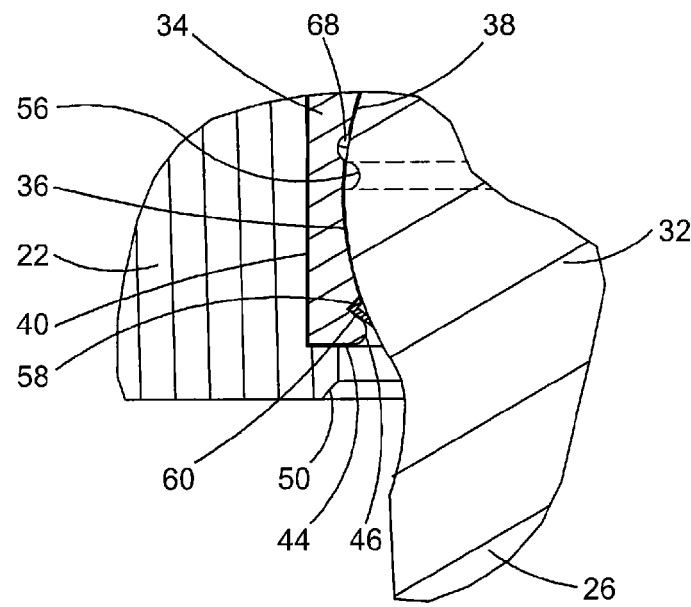
FIG. 4 is an enlarged view of Detail B of the rod end assembly of FIG. 3.

Lubricant may be provided between the external surface 36 of the ball 32 and the inner surface 38 of the outer race 34 to reduce friction there between. The ball 32 may have a centrally located circumferential groove 56 extending inwardly from the external surface 36. Lubricant in the groove 56 is spread over the external surface 36 and the inner surface 38 when the ball 32 moves relative to the outer race 34. A portion of the inner surface 38 proximate the lower end 44 of the outer race 34 has a circumferential seal groove 58 formed therein around the inner surface 38 of the outer race 34. FIG. 4 provides an enlarged view of the portion of the rod end assembly 14 indicated as Detail B on FIG. 3. A generally annular seal 60 having a V-shaped cross section is positioned in the seal groove 58. The seal 60 is secured in the seal groove 58 with the open inward end of the seal 60 protruding from the seal groove 58 and slidingly engaging the external surface 36 of the ball 32. The seal 60 may be formed from a compliant material such as a natural or synthetic rubber and engage the external surface 36 to retain the lubricant inside the spherical bearing 30 and prevent contaminants from entering the spherical bearing 30.

Figure 5:
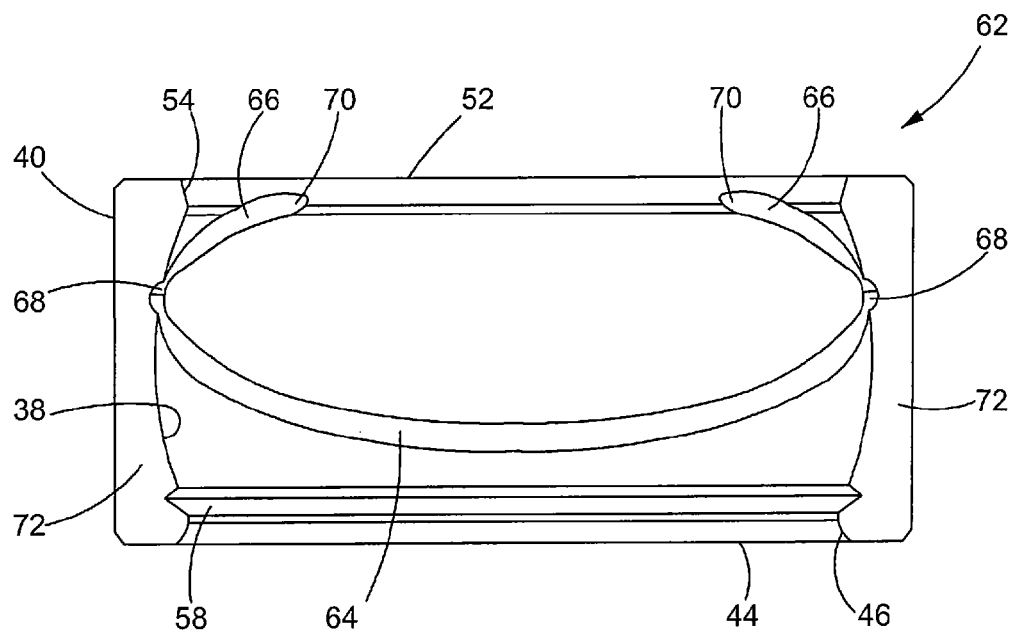
FIG. 5 is a side view of a half race of the outer race of the rod end assembly of FIG. 3.

Returning to FIG. 3, the outer race 34 may have a two-piece construction simplifying assembly of the spherical bearing 30 by allowing the ball 32 to be positioned in one half of the race and then positioning the second half of the race around the ball 32 to form the outer race 34. FIG. 5 illustrates the portion of the inner surface 38 in one half race 62. The other half race 62 is a mirror image of the illustrated half race 62. The portion of the inner surface 38 defined by the half race 62 is shown having a first lubrication groove 64 formed in the inner surface 38 proximate the lower end 44, and a pair of second lubrication grooves 66 formed in the inner surface 38 proximate the upper end 52 and extending toward the lower end 44 to intersect the first lubrication groove 64 at corresponding crossovers 68. The second lubrication grooves 66 also intersect the second tapered portion 54 at corresponding open ends 70.

When the outer race 34 is assembled around the ball 32, corresponding mating surfaces 72 of the half races 62 are brought together with the crossovers 68 of the half races 62 aligning. The crossovers 68 allow the lubricant to cross-flow between the lubrication grooves 64, 66. The crossovers 68 allow the lubricant from the open ends 70 to flow between the lubrication grooves 64, 66 even where a portion of one of the grooves 64, 66 becomes plugged with accumulated debris. After assembly and/or during use of the spherical bearing 30, lubricant injected into the bore 42 enters the lubrication grooves 64, 66 via the open ends 70 and is stored for spreading the lubricant over the external surface 36 of the ball 32 and the inner surface 38 of the outer race 34. The lubrication grooves 64, 66 are in fluid communication with the groove 56 of the ball 32 to transfer lubricant thereto. As the ball 32 rotates within the outer race 34, lubricant from the lubrication grooves 64, 66 contacts the external surface 36 of the ball 32 and lubricant from the groove 56 contacts the inner surface 38 of the outer race 34 to coat both surfaces 36, 38 and keep the spherical bearing 30 properly lubricated to extend the useful life of the spherical bearing 30.

As shown in FIG. 3, the bore 42 extends through the rod end housing 22 and is defined by an inner surface 80 of the rod end housing 22 having varying inner diameters facilitating positioning of the components of the spherical bearing 30 within the bore 42. The inner surface 80 extends from the tapered portion 50 of the bore 42 to a lower cylindrical bore portion 82 having a first bore inner diameter that is smaller than the outer diameter of the external surface 40 of the outer race 34. The lower bore portion 82 transitions to an intermediate cylindrical bore portion 84 at a lower annular bore shoulder 86. The intermediate bore portion 84 has a second bore inner diameter that is larger than the first bore inner diameter but approximately equal to the outer diameter of the external surface 40 of the outer race 34 so that the outer race 34 may be inserted into the intermediate bore portion 84 with and interference fit. The intermediate bore portion 84 transitions to an upper cylindrical bore portion 88 at an upper annular bore shoulder 90. The upper bore portion 88 has a third bore inner diameter that is larger than the second bore inner diameter. At the upper bore portion 88, the inner surface 80 includes internal threads 92 that mesh with corresponding external threads of the bearing retainer 28 in a manner described more fully below.

When the rod end assembly 14 is assembled, the seal 60 is placed around the ball 32 and the half races 62 are positioned around the ball 32 with the seal 60 disposed in the seal groove 58 to form the outer race 34. The stud 24 and connection end 26 are inserted through the bore 42, entering proximate the upper bore portion 88 and exiting proximate the upper bore portion 88. The ball 32 and outer race 34 follow the stud 24 with the lower end 44 of the outer race 34 leading into the bore 42. Force is applied at the upper end 52 of the outer race 34 to insert the outer race 34 into the intermediate bore portion 84 until the lower end 44 is engaged by the lower bore shoulder 86.

Figure 6:
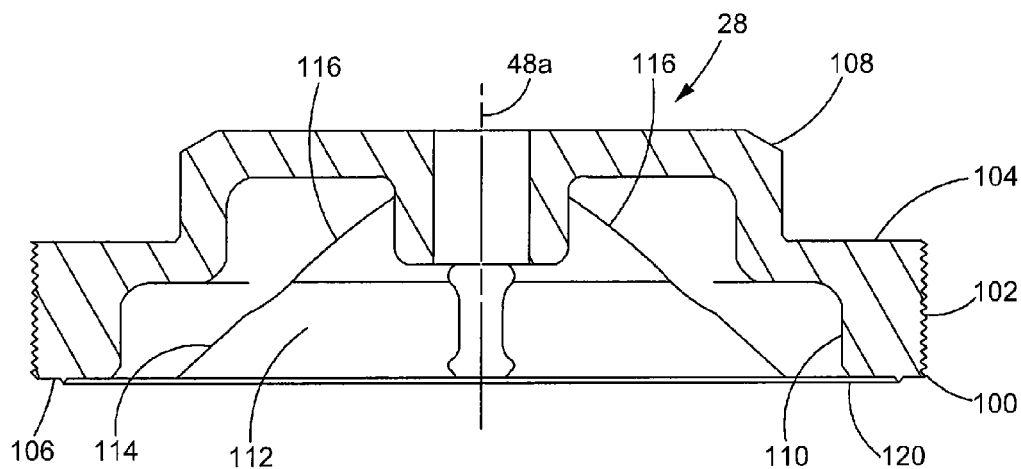
FIG. 6 is a cross-sectional view of the bearing retainer of the rod end assembly of FIG. 3 in accordance with the present disclosure.

Once the ball 32 and the outer race 34 are installed, the lubricant can be added and the bearing retainer 28 installed at the upper bore portion 88. The bearing retainer 28 is shown in greater detail in FIG. 6. The bearing retainer 28 is a generally cylindrical hollow cap for the bore 42 and has a cylindrical outer surface 100 centered on a longitudinal axis 48a of the bearing retainer 28 and having external threads 102. The outer surface 100 and external threads 102 are dimensioned so that the outer diameter of the outer surface 100 is less than the inner diameter of the upper bore portion 88 of the bore 42, and the external threads 102 engage and mesh with the internal threads 92 of the inner surface 80 to allow the bearing retainer 28 to be screwed down into the bore and retain the spherical bearing 30 therein as described more fully below. The bearing retainer 28 further includes an annular top surface 104 and an annular bottom surface 106 that may be generally perpendicular to the longitudinal axis 48a and define the upper and lower extents of the outer surface 100.

A centrally disposed tool engagement portion 108 of the bearing retainer 28 extends upwardly from the top surface 104. The tool engagement portion 108 is configured to be engaged by a tool to screw the bearing retainer 28 down into the bore 42 or unscrew the bearing retainer 28 from removal from the bore 42. In the present embodiment, the tool engagement portion 108 may have a generally hexagonal shape having six flat sides that may be engaged by a tool such as a socket wrench, channel lock grips, or the like that will impart torque on the bearing retainer 28 to rotate the retainer 28 about the longitudinal axis 48a during installation and removal. Of course, the tool engagement portion 108 may have any other appropriate shape corresponding to a tool to be used to install the bearing retainer 28.

To provide clearance for movement of the ball 32 within the outer race 34 and to allow a quantity of lubricant to be stored therein, an interior surface 110 of the bearing retainer 28 may define an interior lubricant cavity or reservoir 112 within the bearing retainer 28. The interior surface 110 may also define lower structural ribs 114 and upper structural ribs 116 providing additional structural support for the top surface 104 and tool engagement portion 108, respectively, without encroaching on the interior space reserved for movement of the ball 32. The lubricant cavity 112 may be placed in fluid communication with the ambient atmosphere external to the bearing retainer 28 by providing a fill port 118 through one of the top surface 104 and tool engagement portion 108 of the bearing retainer 28. As shown, the fill port 118 may be centrally disposed through the tool engagement portion 108 along the longitudinal axis 48a, but may be located at any other appropriate position to allow lubricant to be injected there through and into the lubricant cavity 112 during initially assembly and, if necessary, during later use to replenish the lubricant in the lubricant cavity 112. When not used to provide access to the lubricant cavity 112, the fill port 118 may be closed off and sealed by a corresponding fill cap (not shown) forming a substantially water-tight seal to retain the lubricant within the lubricant cavity 112.

Figure 7:
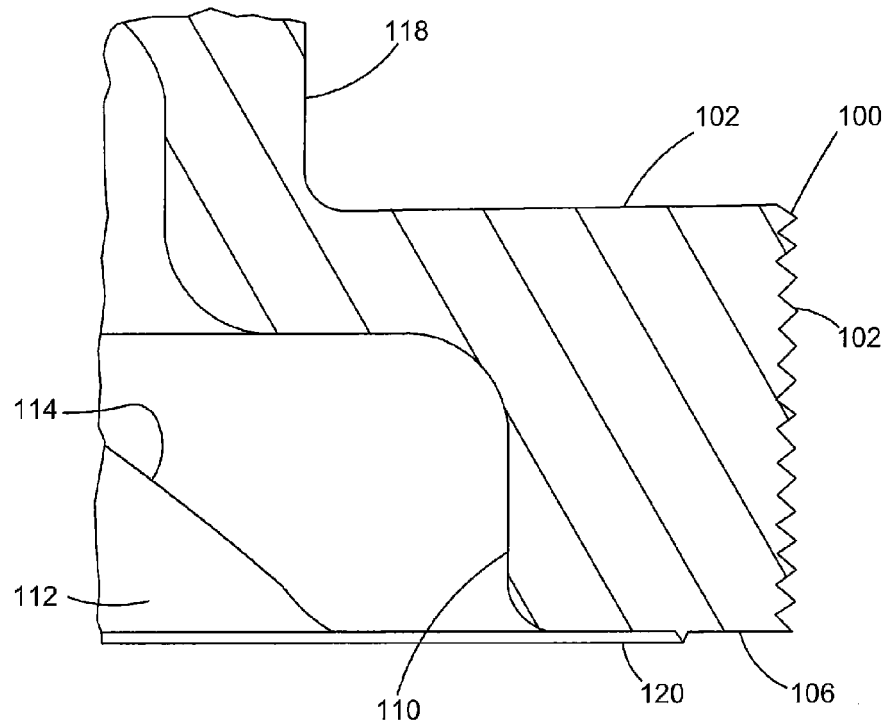
FIG. 7 is an enlarged view of the right side of the bearing retainer of FIG. 6.

The bearing retainer 28 in accordance with the present disclosure includes an integrated sealing mechanism to more reliably ensure that lubricant does not leak out along the outer surface 100 of the bearing retainer 28 during use of the rod end assembly 14. The bearing retainer 28 includes an annular sealing rib 120 extending downwardly from the bottom surface 106 of the retainer 28 and being centered about the longitudinal axis 48a. As shown in the enlarged portion of the bearing retainer of FIG. 7, the sealing rib 120 may have an approximately triangular cross-section. However, the sealing rib 120 may have any other appropriate cross-sectional shape allowing the sealing rib 120 to form a substantially water-tight seal when the bearing retainer is installed, such as square, rectangular, semi-circular and the like capable of forming a seal as discussed more fully below. Moreover, the circular configuration illustrated herein is contemplated by the inventors, but the sealing rib 120 may be provided in non-circular configurations as necessary to form a sufficiently tight seal in other implementations.

Returning to FIG. 3, the bearing retainer 28 is installed by aligning the outer surface 100 of the retainer 28 within the upper bore portion 88 with the threads 92, 102 meshing. The bearing retainer 28 is screwed down into the bore 42 until the bottom surface 106 of the retainer 28 engages the upper bore shoulder 90 of the inner surface 80. The sealing rib 120 first engages the upper bore shoulder 90 and the sealing rib 120 is crushed between the upper bore shoulder 90 and the bottom surface 106 as the bearing retainer 28 is further tightened to form the substantially water-tight seal there between. So that the seal may be properly formed between the inner surface 80 and the bearing retainer 28, the bearing retainer 28 may be fabricated from an appropriate material providing sufficient strength for securing the retainer 28 without stripping the external threads 102 while allowing the sealing rib 120 to crush against the upper bore shoulder 90. For example, the bearing retainer may be formed from a 33% glass fiber reinforced nylon 66 resin having a flexural modulus of approximately 144 MPa. Such a material may be deformable at the sealing rib 120 but provide sufficient strength to prevent the threads from stripping under the anticipated thrust loads to which the spherical bearing 30 will be subjected. Of course, other materials providing the necessary combination of strength for retaining the bearing retainer 28 within the bore 42 while allowing deformation at the sealing rib 120 will be apparent to those skilled in the art and are contemplated by the inventors as having use in rod end assemblies in accordance with the present disclosure.

Figure 8:
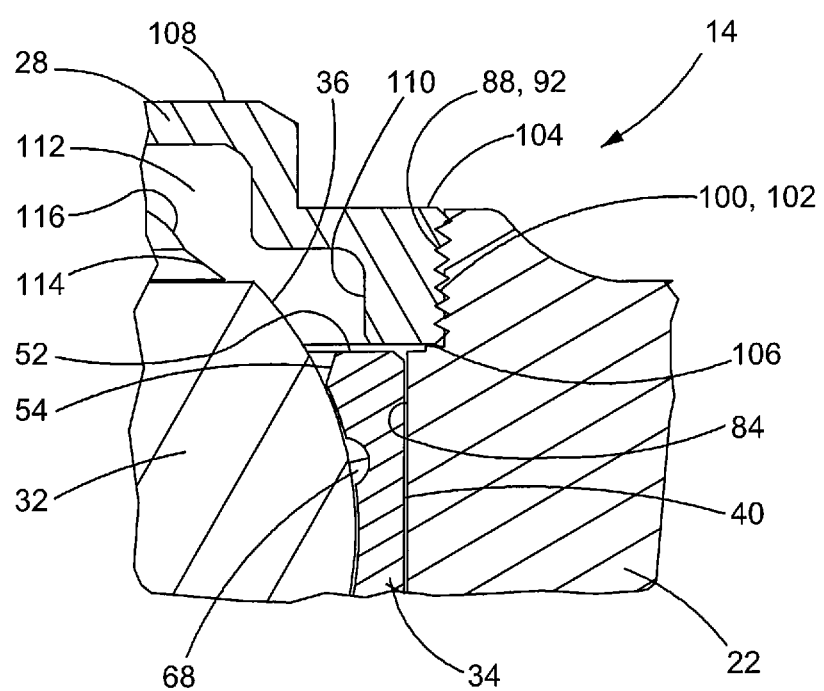
FIG. 8 is an enlarged view of Detail C of the rod end assembly of FIG. 3.

Once assembled, the bearing retainer 28 can engage the outer race 34 to retain the outer race 34 and, correspondingly, the ball 32 within the bore 42 during use. The outer race 34 and the intermediate bore portion 84 of the inner surface 80 are dimensioned to allow for some movement of the outer race 34 parallel to the longitudinal axis 48. FIG. 8 provides an enlarged view of the portion of the rod end assembly 14 indicated as Detail C on FIG. 3. The outer race 34 may have a height from the lower end 44 to the upper end 52 that is less than the height of the intermediate bore portion 84 from the lower bore shoulder 86 to the upper bore shoulder 90. The outer race 34 is inserted into the intermediate bore portion 84 until the lower end 44 engages the lower bore shoulder 86 so that the upper end 52 is disposed below the upper bore shoulder 90. When the bearing retainer 28 is screwed down into the upper bore portion 88, the sealing rib 120, which has a diameter that is greater than the inner diameter of the intermediate bore portion 84, is crushed against the upper bore shoulder 90 and a space exists between the bottom surface 106 of the bearing retainer 28 and the upper end 52 of the outer race 34.

The interference fit between the external surface 40 of the outer race 34 and the intermediate bore portion 84 of the inner surface 80 provides the primary retention forces holding the outer race 34 in place. For small thrust loads, the outer race 34 remains in the position shown in FIG. 8. When a sufficient thrust load is applied to the spherical bearing 30, the frictional forces between the external surface 40 of the outer race 34 and inner surface 80 at the intermediate bore portion 84 may be overcome, and the outer race 34 may slide toward the bearing retainer 28. Eventually, the upper end 52 of the outer race 34 is engaged by the bottom surface 106 of the bearing retainer 28 to prevent the spherical bearing 30 from being pushed out of the bore 42. When a sufficient thrust load is applied in the opposite direction along the longitudinal axis 48, the outer race 34 may slide downwardly in the intermediate bore portion 84 until the lower end 44 is engaged by the lower bore shoulder 86.

INDUSTRIAL APPLICABILITY

The bearing retainer 28 in accordance with the present disclosure provides improved sealing and retention than previously known spherical bearing retention systems. The meshing threads 92, 102 of the bore 42 and the retainer 28, respectively, provide alignment of the bearing retainer 28 within the bore 42 to ensure flush contact between the sealing rib 120 and the upper bore shoulder 90 about the entire circumference of the sealing rib 120. This corrects the tendency in previous retainers for misalignment during assembly resulting in the loss of lubricant during use. The consistent contact results in a correspondingly consistent seal formed when the sealing rib 120 is crushed between the bottom surface 106 and the upper bore shoulder 90.

The design of the bearing retainer 28 further provides simplicity and cost savings in the manufacture and assembly of mechanisms such as the rod end assembly 14 over previous mechanisms. Integration of the sealing rib 120 into the bearing retainer 28 reduces the number of components in the assembly 14 be eliminating the need for an additional sealing mechanism, such as an O-ring seal or other types of rubber or foam seals that may become misaligned during assembly, and can tend to degrade and leak during the otherwise useful life of the spherical bearing 30. Moreover, the configuration of the bearing retainer 28 allows for the use of a broader range of materials in the manufacture of the assembly 14. For example, the glass fiber reinforced nylon resin is lighter and may be significantly cheaper as a raw material and in manufacturing the bearing retainer 28 than metals such as steel and aluminum alloys having the same or lesser strength than the nylon resin.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible.

Numerous alternative embodiments could be implemented, using either current technology or technology developed after the filing date of this patent, which would still fall within the scope of the claims defining the scope of protection.

What is claimed is:

1. A spherical bearing for an assembly, wherein the assembly comprises a housing having a housing bore defined by a bore inner surface, the bore inner surface comprising a first bore portion having an inner diameter and internal threads, a second bore portion having an inner diameter that is less than the inner diameter of the first bore portion, a first bore shoulder extending between the first bore portion and the second bore portion, and a second bore shoulder extending inwardly from an end of the second bore portion opposite the first bore shoulder, the spherical bearing comprising:
 a ball having a spherical external surface;
 an outer race having a first end, a second end, and an inner surface having a complimentary shape to the spherical external surface of the ball, wherein the outer race is disposed within the second bore portion of the housing bore between the first bore shoulder and the second bore shoulder, with the first end of the outer race being disposed one of flush with the first bore shoulder and below the first bore shoulder when the outer race is disposed within the second bore portion; and
 a bearing retainer comprising:
  an annular top surface,
  an annular bottom surface,
  a cylindrical outer surface extending between the top surface and the bottom surface and including external threads configured to mesh with the internal threads of the first bore portion of the housing bore, and
  an annular sealing rib extending downwardly from the bottom surface of the bearing retainer and having a diameter that is greater than an inner diameter of the first bore shoulder, wherein the sealing rib engages the first bore shoulder to form a substantially water-tight seal when the bearing retainer is screwed into the first bore portion of the housing bore, and wherein the bottom surface of the bearing retainer engages the first end of the outer race to retain the outer race within the second bore portion between the first bore shoulder and the second bore shoulder.

2. The spherical bearing of claim 1, wherein the outer race comprises an external surface having an outer diameter that is approximately equal to the inner diameter of the second bore portion so that the outer race is retentively engaged by the second bore portion when the outer race is disposed therein.

3. The spherical bearing of claim 1, wherein the outer race comprises an external surface having an outer diameter, and wherein the bearing retainer comprising an inner surface defining a lubricant cavity therein having an inner diameter proximate the bottom surface of the bearing retainer that is less than the outer diameter of the external surface of the outer race.

4. The spherical bearing of claim 3, wherein the bearing retainer comprises a tool engagement portion extending upwardly from the top surface and configured for engagement for applying torque about a longitudinal axis of the bearing retainer.

5. The spherical bearing of claim 4, comprising a fill port extending from one of the top surface and the tool engagement portion to the inner surface to place the lubricant cavity in fluid communication with an ambient atmosphere when the external threads mesh with the internal threads of the first bore portion of the housing bore and the sealing rib and the first bore shoulder form the substantially water-tight seal.

6. The spherical bearing of claim 1, wherein the sealing rib has a triangular cross-section.

7. The spherical bearing of claim 1, wherein the bearing retainer is fabricated from a 33% glass fiber reinforced nylon 66 resin.

8. The spherical bearing of claim 1, wherein the outer race is slidable within the second bore portion parallel to a longitudinal axis of the spherical bearing between the second bore shoulder and the annular bottom surface of the bearing retainer.

9. A spherical bearing assembly, comprising:
 a housing having a housing bore defined by a bore inner surface, the bore inner surface comprising a first bore portion having an inner diameter and internal threads, second bore portion having an inner diameter that is less than the inner diameter of the first bore portion, a first bore shoulder extending between the first bore portion and the second bore portion, and a second bore shoulder extending inwardly from an end of the second bore portion opposite the first bore shoulder;
 a ball having a spherical external surface;
 an outer race having a first end, a second end, and an inner surface having a complimentary shape to the spherical external surface of the ball, wherein the outer race is disposed within the second bore portion of the housing bore between the first bore shoulder and the second bore shoulder, with the first end of the outer race being disposed one of flush with the first bore shoulder and below the first bore shoulder when the outer race is disposed within the second bore portion; and
 a bearing retainer comprising:
  an annular top surface,
  an annular bottom surface,
  a cylindrical outer surface extending between the top surface and the bottom surface and including external threads configured to mesh with the internal threads of the first bore portion of the housing bore, and
  an annular sealing rib extending downwardly from the bottom surface of the bearing retainer and having a diameter that is greater than the inner diameter of the first bore shoulder, wherein the sealing rib engages the first bore shoulder to form a substantially water-tight seal when the bearing retainer is screwed into the first bore portion of the housing bore, and wherein the bottom surface of the bearing retainer engages the first end of the outer race to retain the outer race within the second bore portion between the first bore shoulder and the second bore shoulder.

10. The spherical bearing assembly of claim 9 wherein the outer race comprises an external surface having an outer diameter that is approximately equal to the inner diameter of the second bore portion so that the outer race is retentively engaged by the second bore portion when the outer race is disposed therein.

11. The spherical bearing assembly of claim 9, wherein the outer race comprises an external surface having an outer diameter, and wherein the bearing retainer comprising an inner surface defining a lubricant cavity therein having an inner diameter proximate the bottom surface of the bearing retainer that is less than the outer diameter of the external surface of the outer race.

12. The spherical bearing assembly of claim 11, wherein the bearing retainer comprises a tool engagement portion extending upwardly from the top surface and configured for engagement for applying torque about a longitudinal axis of the bearing retainer.

13. The spherical bearing assembly of claim 12, comprising a fill port extending from one of the top surface and the tool engagement portion to the inner surface to place the lubricant cavity in fluid communication with an ambient atmosphere when the external threads mesh with the internal threads of the first bore portion of the housing bore and the sealing rib and the first bore shoulder form the substantially water-tight seal.

14. The spherical bearing assembly of claim 9, wherein the sealing rib has a triangular cross-section.

15. The spherical bearing assembly of claim 9, wherein the sealing rib deforms to form the substantially water-tight seal when the bearing retainer is screwed into the first bore portion of the housing bore.

16. The spherical bearing assembly of claim 9, wherein the bearing retainer is fabricated from a 33% glass fiber reinforced nylon 66 resin.

17. The spherical bearing assembly of claim 9, wherein the outer race is slidable within the second bore portion parallel to a longitudinal axis of the spherical bearing between the second bore shoulder and the annular bottom surface of the bearing retainer.

* * * * *